(12) United States Patent
Campbell

(10) Patent No.: US 10,845,513 B2
(45) Date of Patent: Nov. 24, 2020

(54) MIRROR DISPLAY DEVICES

(71) Applicant: Hewlett-Packard Development Company, L.P., Houston, TX (US)

(72) Inventor: Robert Campbell, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 127 days.

(21) Appl. No.: 16/097,786

(22) PCT Filed: Jul. 11, 2016

(86) PCT No.: PCT/US2016/041719
§ 371 (c)(1),
(2) Date: Oct. 30, 2018

(87) PCT Pub. No.: WO2018/013074
PCT Pub. Date: Jan. 18, 2018

(65) Prior Publication Data
US 2019/0154888 A1    May 23, 2019

(51) Int. Cl.
*G02B 5/08* (2006.01)
*G09F 27/00* (2006.01)
(Continued)

(52) U.S. Cl.
CPC ........... *G02B 5/085* (2013.01); *G06F 1/1601* (2013.01); *G06F 3/042* (2013.01); *G06F 3/044* (2013.01);
(Continued)

(58) Field of Classification Search
CPC ..... G02B 5/058; G02B 27/144; G06F 1/1601; G06F 3/042; G06F 3/0421; G06F 3/044;
(Continued)

(56) References Cited

U.S. PATENT DOCUMENTS 8,058,977 B2    11/2011  Lynam
10,477,145 B2 *  11/2019  Ito ..................... H04L 65/4015
(Continued)

FOREIGN PATENT DOCUMENTS

CN         1860429      11/2006
CN       202183087 U     4/2012
(Continued)

OTHER PUBLICATIONS

Blog ~ "Building Mirror Mirror"~ 2015 ~ 16 pages ~ http://blog.dylanjpierce.com.
(Continued)

*Primary Examiner* — Collin X Beatty
(74) *Attorney, Agent, or Firm* — Trop Pruner & Hu PC

(57) ABSTRACT

In some examples, a mirror display device includes a mirror comprising a surface, and a display panel to display an image that is visible through the mirror, the display panel having a display area that is less than an area of the surface of the mirror. A touch controller is to detect a touch input on the surface, and determine whether the touch input is made at a location of the surface corresponding to the display area of the display panel, or at a location of the surface that is away from the display area of the display panel.

15 Claims, 5 Drawing Sheets

(51) Int. Cl.
*G06F 3/042* (2006.01)
*G06F 3/044* (2006.01)
*G09F 9/30* (2006.01)
*G09F 9/33* (2006.01)
*G06F 1/16* (2006.01)
*G02B 27/14* (2006.01)

(52) U.S. Cl.
CPC .............. *G06F 3/0421* (2013.01); *G09F 9/30* (2013.01); *G09F 9/33* (2013.01); *G09F 27/005* (2013.01); *G02B 27/144* (2013.01); *G06F 2203/04109* (2013.01); *G06F 2203/04809* (2013.01)

(58) Field of Classification Search
CPC . G06F 2203/04109; G06F 2203/04809; G09F 9/30; G09F 9/33; G09F 27/005
USPC ......................................................... 359/838
See application file for complete search history.

(56) References Cited

U.S. PATENT DOCUMENTS

| | | | |
|---|---|---|---|
| 2005/0195972 A1* | 9/2005 | Barr | G06F 1/1601 379/435 |
| 2009/0243824 A1 | 10/2009 | Peterson et al. | |
| 2014/0347319 A1* | 11/2014 | Lin | G06F 3/044 345/174 |
| 2017/0323364 A1* | 11/2017 | Schmitz-Le Hanne | G09F 23/00 |
| 2018/0003971 A1* | 1/2018 | Mischel, Jr. | G02B 5/0808 |
| 2018/0012526 A1* | 1/2018 | Dunn | G09F 27/005 |

FOREIGN PATENT DOCUMENTS

| | | |
|---|---|---|
| CN | 103479140 A | 1/2014 |
| CN | 103679781 A | 3/2014 |
| EP | 3035322 | 12/2014 |
| KR | 20090039392 A | 4/2009 |
| TW | 201617813 A | 5/2016 |
| WO | WO-2005/031552 A2 | 4/2005 |
| WO | WO-2008108558 | 9/2008 |

OTHER PUBLICATIONS

Moon ~ "Samsung Reveals Plans for New Mirror and Transparent OLED Displays"~ 2011 ~ 7 pages ~ http://www.engadget.com.
Nui Group Community Wiki, "Frustrated Total Internal Reflection (FTIR)," Redirected from FTIR; http://wiki.nuigroup.com/FTIR; Jun. 10, 2016, 5 pages.
RAPT, Multi-touch technology by RAPT; "Introducing the 'SOLAS TM' Multi-Touch Software Platform"; http://www.rapttouch.com/; Jun. 10, 2016, 30 pages.
Sangmoon ~ "'Mirror Display', The Magic of Mirrors Begins!"~ 2016 ~ 4 pages ~ http://www.lgcnsblog.com/.
Webpage ~ Pro Display Interactive Mirror Multi-touch Display at ISE 2016: for Retail, Visitor Attractions, Events, Exhibitions and More . . . 2016 ~ https://vimeo.com.
Wikipedia, "Total Internal Reflection," https://en.wikipedia.org/wiki/Total_internal_reflection, Jun. 10, 2016, 11 pages.
Flatfrog Laboratories AB; "New Transparent Oled Displays From Eyevis Powered By FlatFrog"; http:www.flatfrog.com/news/new-transparent-oled-displays-eyevis-powered-flatfrog; Jun. 1, 2016, 2 pages.
Tom Warren, The Verge; "Samsung's first mirror displays are now being used in a hair salon"; http://www.theverge.com/circuitbreaker/2016/5/18/11699652/samsung-mirror-display-hair-salon; May 18, 2016, 2 pages.
Vimeo; "Pro Display interactive mirror multi-touch display at ISE 2016: For retail, visitor attractions, events, exhibitions and more . . . on Vimeo"; https://vimeo.com/158616567?from-outro-embed; Jun. 10, 2016, 3 pages.

* cited by examiner

MIRROR DISPLAY DEVICES

BACKGROUND

A display device can include a display area to display images. A display device can be a touch-sensitive display device, which includes a display surface that is sensitive to touch by a user. The touch inputs on the display surface are processed by a processor as touch events that can cause respective tasks to be performed.

BRIEF DESCRIPTION OF THE DRAWINGS

Some implementations of the present disclosure are described with respect to the following figures.

DETAILED DESCRIPTION

Figure 1A:
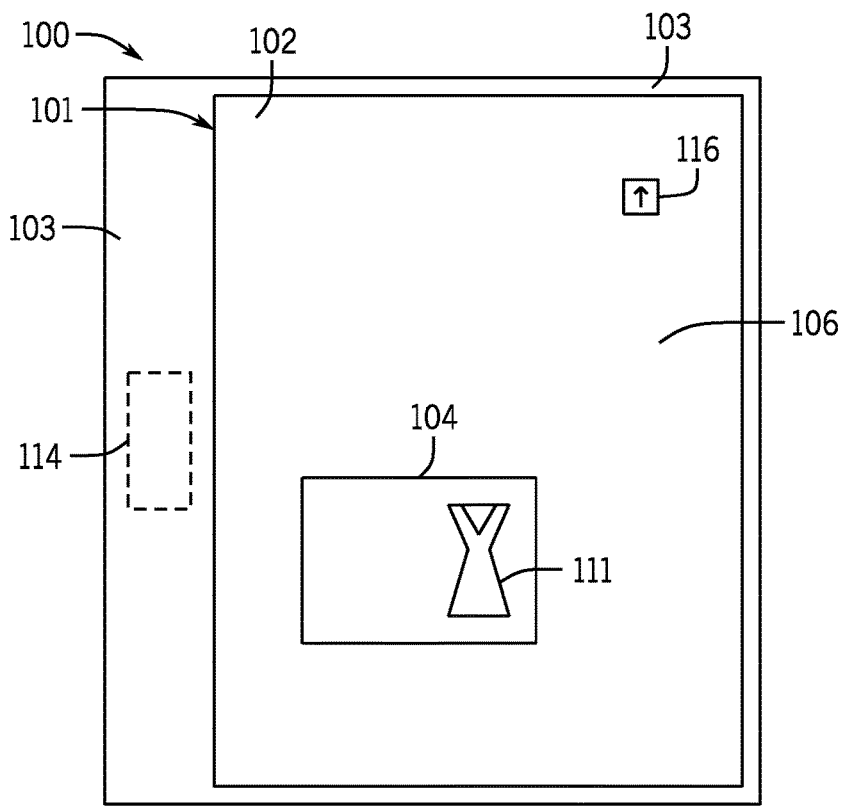
FIG. 1A is a front view of a mirror display device according to some examples.

A mirror display device is a display device that includes a mirror and a display panel that can produce images (e.g., graphics and/or text) that are visible through the mirror. Examples of display panels that can be used in mirror display devices include a liquid crystal display (LCD) panel, an organic light-emitting diode (OLED) display panel, or any other type of display panel that can be actively controlled to cause display of images. The presence of a mirror allows a user of the mirror display device to see a reflection of the user in the mirror. Mirror display devices can be used as a dressing room mirror in a clothing store, a wall mirror in a bathroom or in other locations of a house, or other mirrors used in other contexts.

In some cases, a mirror display device can have a relatively large mirror surface (e.g., a mirror surface having a long length to allow a user to view substantially the reflection of the user's entire body in the mirror surface). Using a display panel that has the same display area as a large mirror surface can increase the cost of a mirror display device, since the cost of a display panel can rise exponentially with its size.

On the other hand, reducing the size of a mirror display device to reduce its cost can result in the mirror display device being too small for some use cases, such as in dressing rooms and so forth.

In accordance with some implementations of the present disclosure, a mirror display device is provided that includes a display panel having a display area (for displaying images generated by the display panel) that is smaller than the surface area of a mirror surface of the mirror display device. The mirror surface includes a first region corresponding to the display area of the display panel. Images produced by the display panel are visible through the first region of the mirror surface. In addition, the mirror surface includes a second region outside the first region, where the images produced by the display panel are not visible through the second region. In some examples, the second region can be a peripheral region around at least a portion of the first region. More generally, the second region can occupy an area of the mirror surface that is away from the first region.

The mirror display device further includes a touch sensing system that is able to detect touch inputs both in the mirror surface's first region corresponding to the display area of the display panel, and in the mirror surface's second region. A first touch input received at a location in the first region is processed using a first type of touch control process, while a second touch input received at a location in the second region is processed using a second type of touch control process that is different from the first type of touch control process.

The first type of touch control process is a touch control process for handling touch events relating to an image displayed by the display panel. For example, an operating system can control the display of an image by the display panel, where the image can include various control items (e.g., control buttons, drop-down menus, etc.) of a graphical user interface (GUI). A user can make touch selections with respect to the displayed control items to cause the operating system to perform respective tasks in response to the selections of the control items.

The second type of touch control process is a touch control process that does not depend on any control elements displayed by the display panel. In some examples, information can be displayed in the second region away from the first region corresponding to the display area of the display panel. Such displayed information can include text, an icon, or any other indicator. A user can touch the mirror surface at a location of the displayed information in the second region, and a control action can be performed in response to this touch input. For example, the displayed information can be a volume control icon (to control the audio volume that is being output by a system that includes the mirror display device), a display adjustment icon (such as to adjust the brightness or contrast of information displayed by the display panel), or any other information element that can cause a corresponding task to be performed.

Figure 1B:
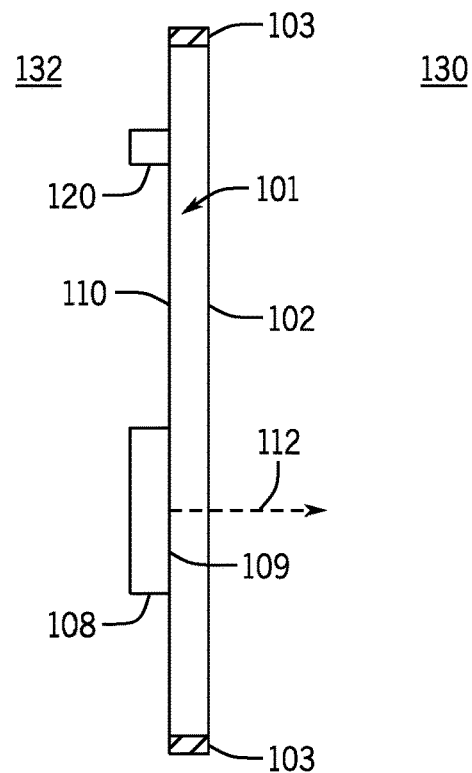
FIG. 1B is a side view of the mirror display device of FIG. 1A, according to some examples.

FIGS. 1A-1B illustrates an example mirror display device 100 according to some implementations. FIG. 1A is a front view of the mirror display device 100, while FIG. 1B is a side view of a portion of the mirror display device 100. The mirror device 100 includes a surface 102 of a mirror 101. The surface 102 is referred to as a "mirror surface" in the ensuing discussion. The mirror surface 102 is the front surface of a mirror in which a reflection of an object in front of the mirror is visible. The mirror 101 is supported by a frame 103 of the mirror display device 100, where the frame 103 extends around the periphery of the mirror 101. Although FIG. 1A shows an example where the mirror 101 is smaller in size than the frame 103, it is noted that in other examples, the mirror 101 can be larger than the frame 103, in which case the mirror 101 would cover the frame 103.

The mirror 101 can be a two-way mirror, such that a user on a front side 130 of the mirror 101 sees a reflection if no light is generated on a rear side 132 of the mirror 101. However, if the display panel 108 produces light (i.e., the light of an image generated by the display panel 108), then the image generated by the display panel 108 is visible through the mirror 101.

A two-way mirror can be formed using any of various different technologies. For example, the glass of the mirror 101 can be partially metallized (by providing a thin and almost transparent layer of metal, such as aluminum or some other metal). In other examples, a film layer can be added to the mirror 101 to create the two-way mirror effect. This film can include a layer of metal, such as aluminum and so forth.

The mirror surface 102 includes a first region 104 and a second region 106, where the second region 106 is away from the first region 104, and the second region 106 does not include the first region 104. In examples according to FIG. 1A, the second region 106 can be a peripheral region that surrounds the first region 104. In other examples, the first and second regions 104 and 106 can have other shapes and orientations with respect to each other.

As shown in FIG. 1B, a display panel 108 is positioned adjacent a rear surface 110 of the mirror 101. In examples according to FIG. 1B, the front display area 109 of the display panel 108 is in contact with the rear surface 110 of the mirror 101. In other examples, at least one intervening transparent layer can be provided between the front display area 109 of the display panel 108 and the rear surface 110 of the mirror 101. An image 111 (FIG. 1A) generated by the display panel 108 is visible in the front display area 109 and can be viewed through the mirror 101, as indicated generally by an arrow 112 in FIG. 1B. More specifically, the image 111 generated by the display panel 108 is visible in the first region 104 in the mirror surface 102.

The overall area of the mirror surface 102 is larger than the front display area 109 of the display panel 108. In some examples, the first region 104 generally has the same area as the front display area 109 of the display panel 108.

The second region 106 includes the remainder of the mirror surface 102 that does not include the first region 104. The second region 106 can display information that is distinct from the image generated by the display panel 108. For example, an information element 116 can be displayed in the second region 106. The information element 116 is displayed by a display element 120 that is separate from the display panel 108. In examples according to FIG. 1A, the information element 116 includes an arrow. A touch input made by a user on the information element 116 can be detected by the mirror display device 100 to cause a control task to be performed, such as to control a volume, control a characteristic (e.g., brightness, contrast) of the display panel 108, or another control task. Although just one information element 116 is shown in FIG. 1A, it is noted that multiple information elements can be displayed in the second region 106 that can be touched by a user to cause respective control tasks to be performed. In such examples, multiple display elements (similar to display element 120) can be arranged adjacent the rear surface 110 of the mirror 101 to display respective different information elements in the second region 106.

As with the display panel 108, the front surface of the display element 120 can be contacted to the rear surface 110 of the mirror 101, or alternatively, at least one intervening layer (which can be transparent) can be provided between the front surface of the display element 120 and the rear surface 110 of the mirror 101.

The mirror display device 100 further includes a touch controller 114 that is able to detect touch inputs on the mirror surface 102. The touch controller 114 is illustrated in dashed profile to indicate that the touch controller 114 is housed within an outer housing of the mirror display device 100. The touch controller 114 is able to determine whether the touch input is made at a location of the mirror surface 102 that corresponds to the display area of the display panel (i.e., the touch input is made at a location in the first region 108), or at a location of the mirror surface 102 that is away from the display area of the display panel (i.e., the touch input is made at a location in the second region 106).

The touch controller 114 can include a hardware processing circuit, such as a microprocessor, a core of a multi-core microprocessor, a microcontroller, a programmable gate array, a programmable integrated circuit, or another type of a hardware processing circuit. In other examples, the touch controller 114 can include a combination of a hardware processing circuit and machine-readable instructions executable on the hardware processing circuit.

Figure 2A:
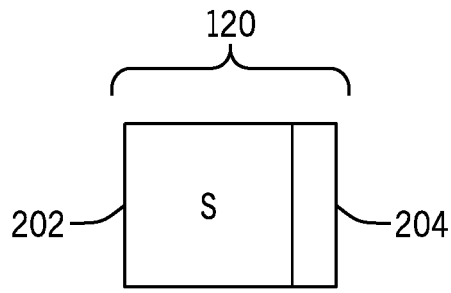
FIG. 2A is a side view of a display element according to further examples.

FIG. 2A shows a side view of the display element 120 according to some examples. The display element 120 can include a light source 202 and a mask layer 204 that is positioned in front of the light source 202. The light source 202 can include a light emitting element, such as a light emitting diode (LED) or other type of element that can emit light. In some examples, the light source 202 can include one light emitting element. In other examples, the light source 202 can include multiple light emitting elements, such as light emitting elements of different colors.

Figure 2B:
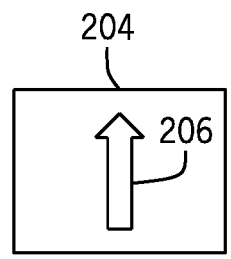
FIG. 2B is a front view of a mask used in a display device according to further examples.

The mask layer 204 includes a pattern to define an information element (e.g., the information element 116 of FIG. 1A) that is to be displayed by the display element 120. For example, as shown in FIG. 2B, which is a front view of the mask layer 204, an arrow symbol 206 is provided by the mask layer 204. Light can pass through the arrow symbol 206, but cannot pass through the remainder of the mask layer 204. The region that defines the arrow symbol 206 is transparent or translucent, while the remainder of the mask layer is opaque. In other examples, instead of an arrow symbol, the mask layer 204 can provide a different pattern to be displayed.

In further examples, the display element 120 can be a small LCD panel or other type of display element.

Figure 3A:
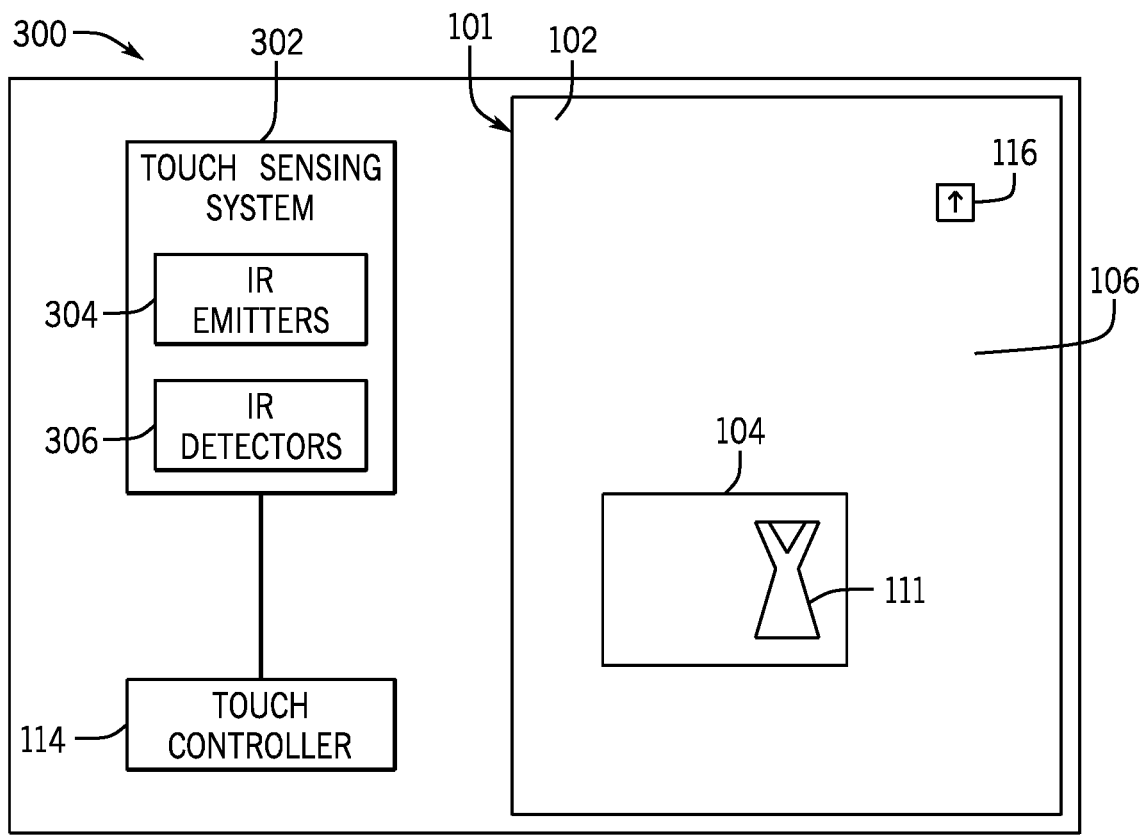
FIG. 3A is a block diagram of a mirror display device according to additional examples.

FIG. 3A is a block diagram of a mirror display device 300 according to further examples. The mirror display device 300 includes a touch sensing system 302 to detect touch inputs (made by a user) on the mirror surface 102. Note that the touch sensing system 302 and the touch controller 114 are shown as blocks of the mirror display device 300 for discussion purposes. The touch sensing system 302 and the touch controller 114 are components that are housed within the housing of the mirror display device 300. In response to detecting a touch on the mirror surface 102, the touch sensing system 302 communicates an indication of the detected touch to the touch controller 114.

Although the touch controller 114 and the touch sensing system 302 are depicted as being separate components, it is noted that in other examples, the touch controller 114 and the touch sensing system 302 can be integrated into one component, such as in an integrated circuit chip or on a circuit board.

Figure 3B:
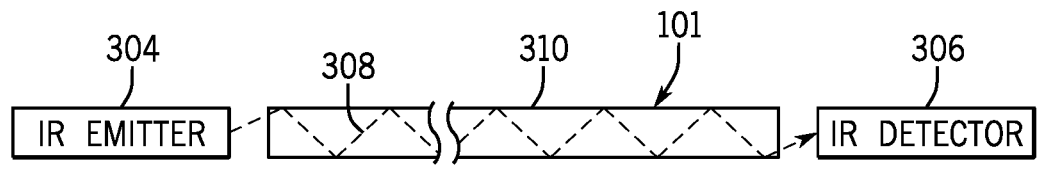
FIG. 3B illustrates an arrangement including an infrared (IR) emitter, a mirror glass layer, and an IR detector, according to additional examples.

The touch sensing system 302 can be an infrared (IR)-based touch sensing system, such as an IR-based sensing system that uses frustrated total internal reflection (FTIR). The touch sensing system 302 includes IR emitters 304 to emit IR light into a glass layer of the mirror 101 (in which case the glass layer becomes a light guide for the IR light signals emitted by the IR emitters), or alternatively, the IR emitters 304 can emit light signals above the mirror surface 102 (such that the IR light signals propagate slightly above the mirror surface 102). For example, as shown in FIG. 3B, an IR emitter 304 emits IR light 308 into a glass layer 310 of the mirror 101. The propagated IR light 308 can be detected by a respective IR detector 306.

The IR light 308 can propagate along the glass layer 310 by being reflected between a top surface and a bottom surface of the glass layer 310, as shown in FIG. 3B. With FTIR, when a user's finger comes into contact with a point on the top surface of the glass layer 310, a reflection of an IR light ray is changed (referred to as being "frustrated" using the FTIR technique). Note that the top surface of the glass layer 310 is an interface between the glass layer 310 and the air above the glass layer. Total reflection of an IR light ray from the top surface of the glass layer 310 can occur if no user touch is made to the top surface. However, if a user touches a point on the top surface of the glass layer 310, then the reflection of the IR light ray is affected (i.e., frustrated), such that total reflection of this IR light ray does not occur. The changed reflection of the IR light ray can be detected by the respective IR detector 306.

In some examples, a first array of IR emitters 304 can be arranged along a first side of the mirror 101 to emit IR light rays along respective rows, which can be detected by a first array of IR detectors 306, and a second array of IR emitters 304 can be arranged along a second side of the mirror 101 to emit IR light rays along respective columns, which can be detected by a second array of IR detectors 306. A user touch on the mirror surface 102 can cause a pair of light rays (a first light ray along a respective row and a second light ray along a respective column) to be frustrated. These frustrated light rays are detected by respective IR detectors 306, which can be used to pinpoint the location of the user touch on the mirror surface 102.

Figure 3C:
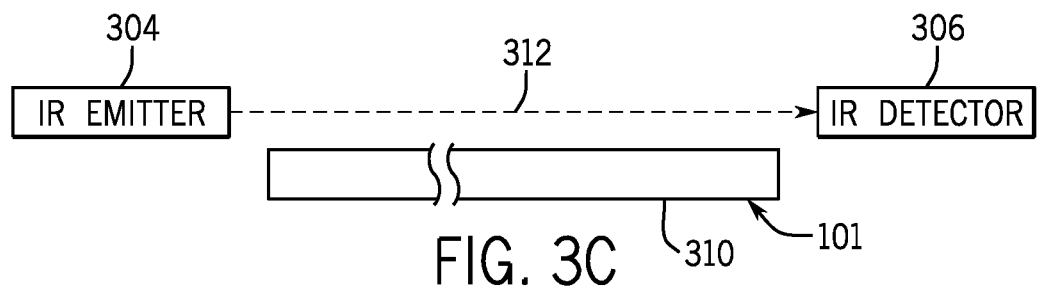
FIG. 3C illustrates another arrangement including an IR emitter, a mirror glass layer, and an IR detector, according to alternative examples.

FIG. 3C shows an alternative arrangement, in which an IR emitter 304 can emit an IR light ray 312 above the top surface of the glass layer 310. The IR light ray 312 is received by an IR detector 306. Multiple IR emitters 304 can emit IR light rays along respective rows and columns. A user finger touching the top surface of the glass layer 310 will cause some IR light rays to be blocked to interrupt detection of IR light rays by respective IR detectors 306. This can be used to determine the point of touch on the top surface of the glass layer 310.

Figure 4:
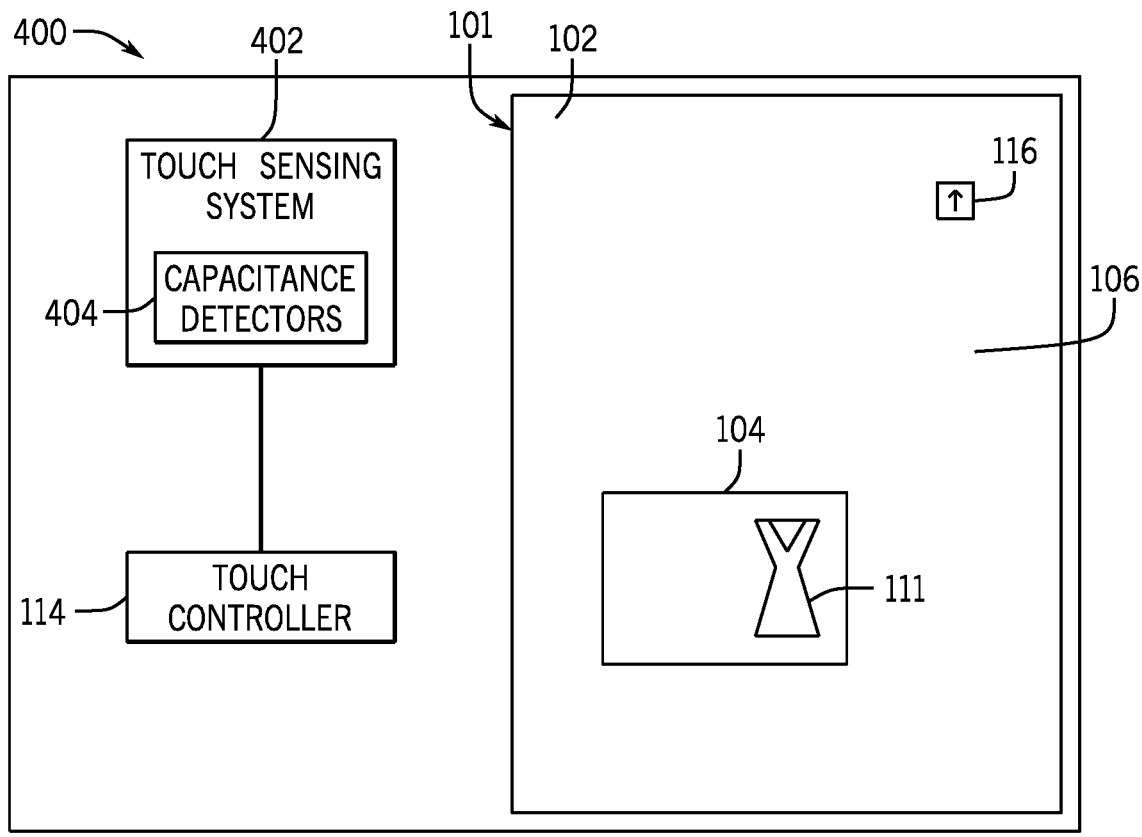
FIG. 4 is a block diagram a mirror display device according to yet further examples.

FIG. 4 shows a mirror display device 400 according to additional implementations. The mirror display device 400 includes a different type of a touch sensing system 402, which includes capacitance detectors 404. A grid of electrodes, formed with a transparent material such as indium tin oxide (ITO), can be formed in one or multiple layers in the mirror 101. A capacitance can be formed with each pair of electrodes in the grid of electrodes. When a user touches a point on the mirror surface 102, the capacitance of one or multiple intersections of the electrodes can be changed, which can be detected by the capacitance detectors 404 for determining the location of the touch input.

Figure 5:
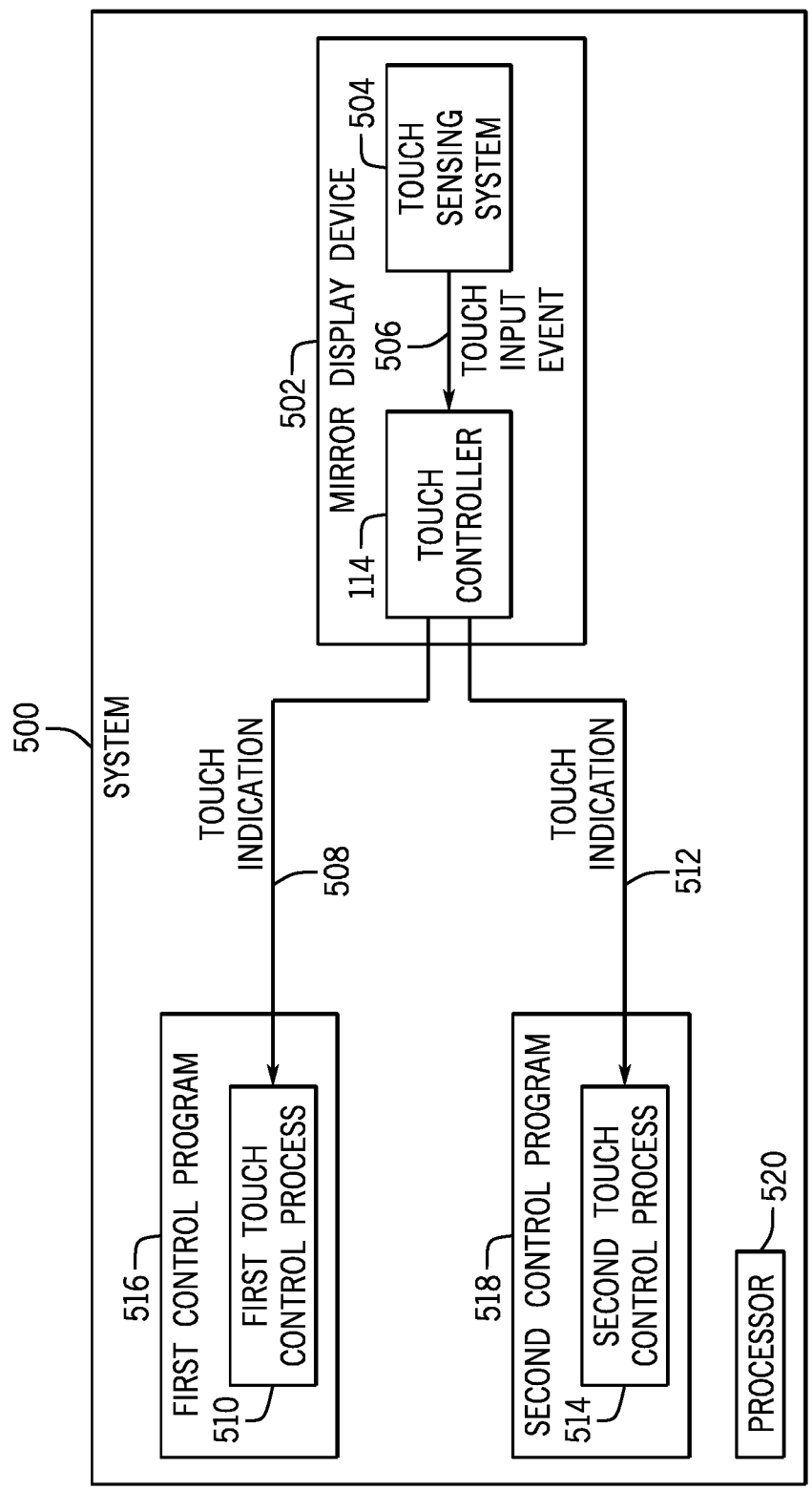
FIG. 5 is a block diagram of a system including a mirror display device according to some examples.

FIG. 5 is a block diagram of an example of a system 500 that includes a mirror display device 502, such as any of the mirror devices shown in FIGS. 1A-1B, 3A, and 4. The system 500 can be a computer system. A touch sensing system 504 (which can be the IR-based touch sensing system 302 of FIG. 3A or the capacitance-based touch sensing system 402 of FIG. 4, for example) can detect a touch on a mirror surface of the mirror display device 502.

In response to the touch, the touch sensing system 302 sends a touch input event 506 to the touch controller 114. The touch input event 506 can include information that allows the touch controller 114 to determine a location of the touch input.

The touch controller 114 determines whether the touch input is made in the first region 104 or the second region 106 of the mirror surface 102 (FIG. 1A, 3A, or 4). In response to determining that the touch input occurred in the first region 104, the touch controller 114 sends a touch indication 508 to a first touch control process 510, where the first touch control process 510 is to handle the touch input.

Alternatively, if the touch controller 114 determines that the touch input is made to a location in the second region 106, then the touch controller 114 outputs a touch indication 512 to a second touch control process 514 for handling the touch input.

In some examples, the first touch control process 510 can be performed by a first control program 516, while the second touch control process 514 can be performed by a second control program 518. As examples, the first control program 516 can be an operating system of the system 500, while the second control program 518 can include a program that is distinct from the operating system. In such examples, a touch input made in the first region 104 (which corresponds to the display area of the display panel 108) is handled by the operating system for processing a touch input to a control element displayed by the display panel 108. On the other hand, the second control program 518 is used to handle a touch input away from the first region 104 that corresponds to the display area of the display panel 108. In such examples, the operating system of the system 500 would not have to be notified to handle touch inputs on the mirror surface 102 away from the first region 104.

The first and second control programs 516 and 518 include machine-readable instructions that are executable on a processor (or multiple processors) 520.

In further examples, the same control program (such as the operating system) can be used to perform both the first touch control process 510 and the second touch control process 514. In such examples, the operating system is modified to be able to handle both touch inputs made to the first region 104 and the second region 106 of the mirror surface 102.

Figure 6:
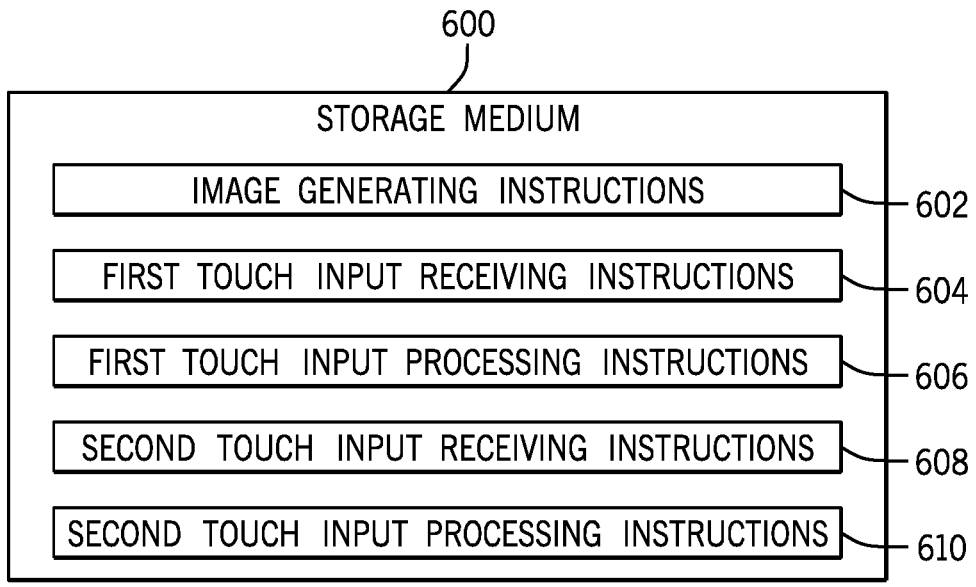
FIG. 6 is a block diagram of a storage medium storing machine-readable instructions according to some examples.

FIG. 6 is a block diagram of a non-transitory machine-readable or computer-readable storage medium 600 that stores machine-readable instructions that upon execution cause a system, such as the system 500 of FIG. 5, to perform various tasks. The machine-readable instructions can include image generating instructions 602 to cause a display panel to generate an image visible through a first region of a mirror surface of a mirror. The machine-readable instructions further include first touch input receiving instructions 604 to receive a first touch input made in the first region of the mirror surface. First touch input processing instructions 606 process the first touch input using a first type of touch control process (e.g., 510 in FIG. 5) for touch inputs made in the first region. Second touch input receiving instructions 608 receive a second touch input made in a second region of the mirror surface, where the second region is outside the first region and displays information of a display element that is separate from the display panel. Second touch input processing instructions 610 process the second touch input using a second type of touch control process (e.g., 514 in FIG. 5) for touch inputs made to the mirror surface away from the first region.

The storage medium 600 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 7:
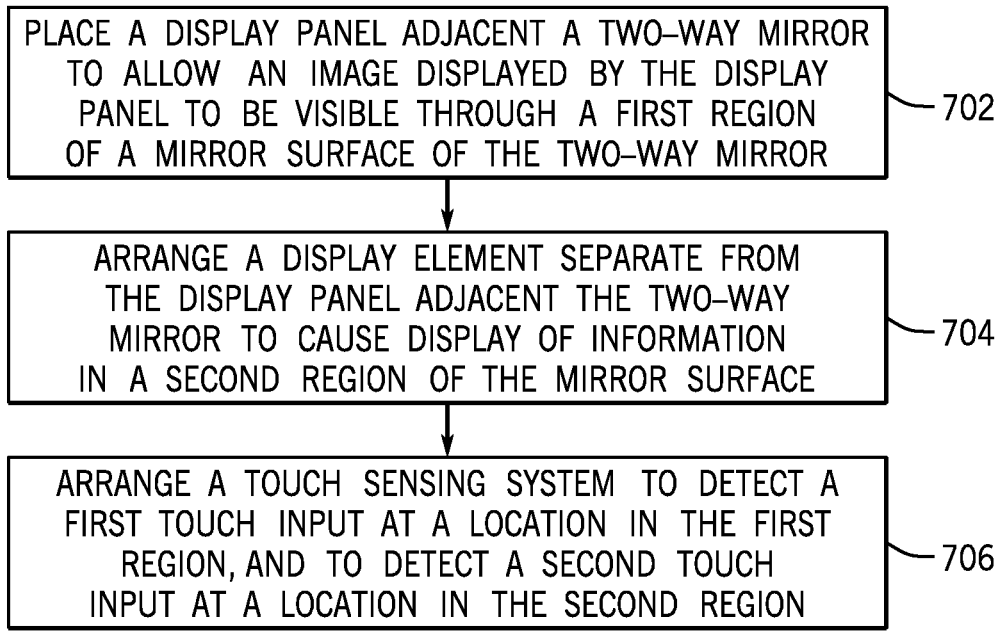
FIG. 7 is a flow diagram of a process of forming a mirror display device according to some examples.

FIG. 7 is a flow diagram of a process of forming a mirror display device according to some examples. The process includes placing (at 702) a display panel adjacent a two-way mirror to allow an image displayed by the display panel to be visible through a first region of a mirror surface of the two-way mirror, where an area of the mirror surface is greater than a display area of the display panel. The process further includes arranging (at 704) a display element separate from the display panel adjacent the two-way mirror to cause display of information in a second region of the mirror surface, the second region away from the first region. The process further includes arranging (at 706) a touch sensing system to detect a first touch input at a location in the first region of the mirror surface, and to detect a second touch input at a location in the second region of the mirror surface.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A mirror display device comprising:
   a mirror comprising a surface;
   a display panel to display an image that is visible through the mirror, the display panel having a display area that is less than an area of the surface of the mirror; and
   a touch controller to:
   detect a touch input on the surface, and
   determine whether the touch input is made at a location of the surface corresponding to the display area of the display panel, or at a location of the surface that is away from the display area of the display panel.

2. The mirror display device of claim 1, wherein the touch controller is to:
   in response to determining that the touch input is made at a location of the surface corresponding to the display area of the display panel, send an indication of the touch input to a first type of touch control process, and
   in response to determining that the touch input is made at a location of the surface that is away from the display area of the display panel, send an indication of the touch input along a second, different type of touch control process.

3. The mirror display device of claim 2, further comprising:
   a first control program to perform the first type of touch control process to handle the touch input made at a location of the surface corresponding to the display area of the display panel; and
   a second control program to perform the second type of touch control process to handle the touch input made at a location of the surface that is away from the display area of the display panel.

4. The mirror display device of claim 3, wherein the first control program is an operating system of the mirror display device, and the second control program is a program different from the operating system.

5. The mirror display device of claim 1, further comprising a light source to produce light to display information in a region of the surface that is away from a region of the surface corresponding to the display area of the display panel, wherein the detected touch input is responsive to a touch of the surface at a location of the displayed information.

6. The mirror display device of claim 1, further comprising a touch sensing system to sense touch inputs in a first region on the surface of the mirror and in a second region on the surface of the mirror, the image displayed by the display panel visible through the first region but not the second region, and the second region being outside of the first region.

7. The mirror display device of claim 6, wherein the touch sensing system comprises:
   infrared emitters to emit infrared light along the mirror; and
   infrared detectors to detect reflected infrared light affected by the touch input.

8. The mirror display device of claim 6, wherein the touch sensing system comprises a capacitance-based sensing system to sense touch inputs on the surface of the mirror.

9. The mirror display device of claim 1, wherein the mirror is a two-way mirror.

10. A non-transitory machine-readable storage medium storing instructions that upon execution cause a system to:
    cause a display panel to generate an image visible through a first region of a mirror surface of a mirror;
    receive a first touch input made in the first region of the mirror surface;
    process the first touch input using a first type of touch control process for the display panel;
    receive a second touch input made in a second region of the mirror surface, the second region outside the first region and displaying information of a display element that is separate from the display panel; and
    process the second touch input using a second type of touch control process for touch inputs made to the mirror surface away from the first region.

11. The non-transitory machine-readable storage medium of claim 10, wherein the first type of touch control process is performed by an operating system of the system, and the second type of touch control process is performed by a program different from the operating system.

12. The non-transitory machine-readable storage medium of claim 10, wherein the first type of touch control process handles the first touch input made with respect to a control element displayed by the display panel, and the second type of touch control process handles the second touch input that does not depend on any control elements displayed by the display panel.

13. A method of forming a mirror display device, comprising:
    placing a display panel adjacent a two-way mirror to allow an image displayed by the display panel to be visible through a first region of a mirror surface of the two-way mirror, wherein an area of the mirror surface is greater than a display area of the display panel;
    arranging a display element separate from the display panel adjacent the two-way mirror to cause display of information in a second region of the mirror surface, the second region away from the first region; and
    arranging a touch sensing system to detect a first touch input at a location in the first region of the mirror surface, and to detect a second touch input at a location in the second region of the mirror surface.

14. The method of claim 13, wherein the second region is a peripheral region around the first region.

15. The method of claim 13, further comprising:
    providing a touch controller to determine a location of a received touch input made with respect to the mirror surface, the touch controller to:
        in response to determining that the location of the received touch input is in the first region, send a touch indication to a first type of touch control process relating to touch inputs for the display panel, and
        in response to determining that the location of the received touch input is in the second region, send a touch indication to a second, different type of touch control process.

* * * * *